Feb. 16, 1937. W. M. PATERSON 2,071,273
PIPE CUTTER GUIDE
Filed July 8, 1935 2 Sheets-Sheet 1
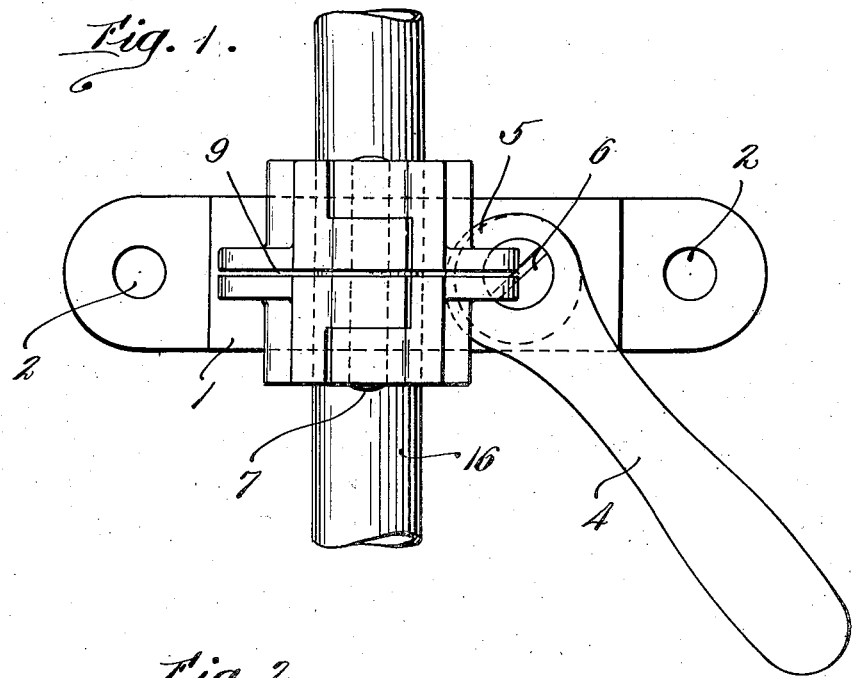
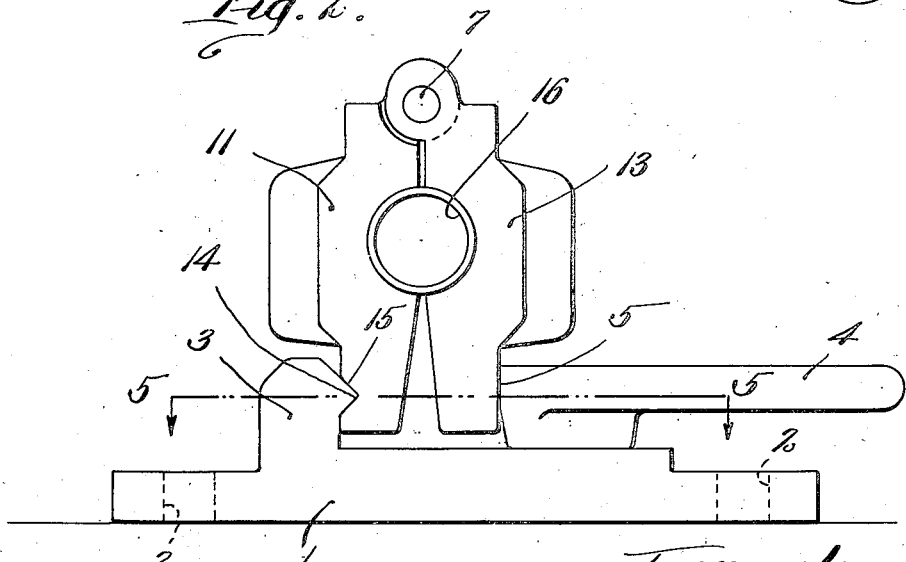

Inventor.
Wilmot M. Paterson
by Robt. C. Hains Atty.

Patented Feb. 16, 1937

2,071,273

UNITED STATES PATENT OFFICE 2,071,273

PIPE CUTTER GUIDE

Wilmot M. Paterson, Wellesley, Mass., assignor to Trimont Manufacturing Co., Inc., Roxbury, Mass., a corporation of Massachusetts Application July 8, 1935, Serial No. 30,348

3 Claims. (Cl. 29—67)

This invention relates to pipe cutter guides and more particularly to the holders or clamps constituting the guide and of the type wherein the pipe to be cut is clamped during the cutting operation and is held substantially throughout the circumference of the pipe in the zone of cut. Pipe cutters of the general character stated are not broadly new, but the object of the present invention is to improve certain features thereof whereby the pipe cutter and guide are simplified and give a wider range of usefulness, all as will be made clear from the following description and accompanying drawings of one good form of a pipe cutter guide containing the present invention.

In the drawings:—

Fig. 1 is a plan view of a device containing the present invention with a pipe held in position for the cutting operation;

Fig. 2 is a side view of the parts shown in Fig. 1;

Figure 3:
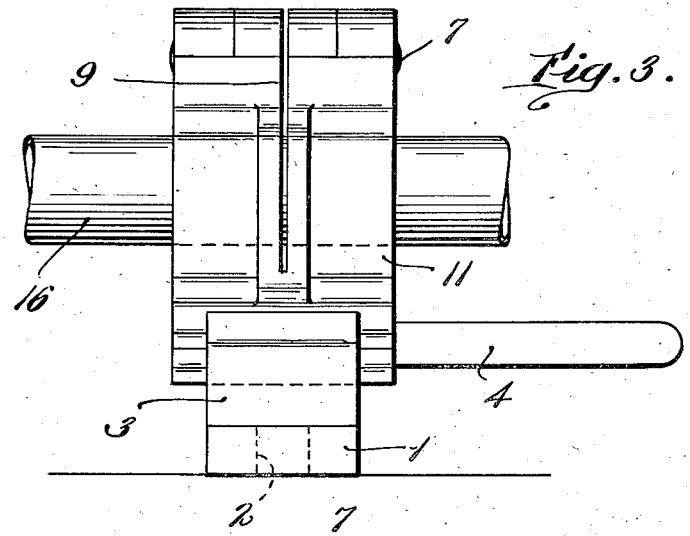
Fig. 3 is a side view at right angles to that of Fig. 2.

The main characteristics of the present invention comprise a base provided with certain structural features to be hereinafter described and the pipe cutter clamp and guide which is normally separated from the base and secured thereto when a pipe is placed within the jaws of the clamp ready to be cut. More specifically, the base portion 1 has openings 2 in the extended flange portions of the base whereby the base may be secured in fixed position on an appropriate support. Extending transversely of the base 1 and rising therefrom is the projection or lug 3 and mounted on the base portion is the clamping device 4 which is constituted with an eccentric portion 5 and is mounted to turn upon a pivotal support 6 extending from the base opposite the lug 3, the construction being such that when the members or jaws of the pipe holder or clamp are inserted between the lug and the clamping device 4 and the latter is turned upon its pivotal support the portions of the holder or clamp are forcefully pushed towards each other and at the same time prevented from movement upwardly or out of the base and laterally or transversely with respect thereto, all as will more fully appear.

Figure 4:
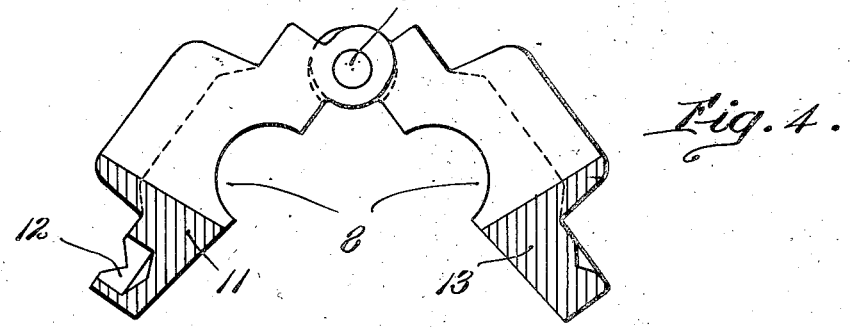
Fig. 4 shows the members of the pipe holder or clamp separated from the base and with the clamping jaws open.

As will be noted the cutter guide or pipe holder is formed of two members hinged together at their upper portions, as indicated at 7, Fig. 4, and each is provided with a substantially semi-circular recess 8, Fig. 4, for the reception of a pipe to be cut.

Passing through the two jaws or members of the holder or clamp and transversely through their pivotal connection at 7 is the cutter guiding slot 9, probably best illustrated in Fig. 1, the construction being such that the cutter guiding slot passes transversely of the longitudinal axis of the pipe to be cut.

When a pipe has been placed in the clamp or holder and the jaws of the clamp or holder have been forced into contact with the exterior surface of the pipe it is essential that the holder or clamp shall be held in undisturbable relation with the base on which it is temporarily mounted.

The lug 3 and at least one of the downwardly extending legs of the holder or clamp are provided with interengaging portions which prevent the holder or clamp and the base from separating in a transverse or upward direction when the holder or clamp has been assembled and locked in position, as indicated in Fig. 2.

Figure 5:
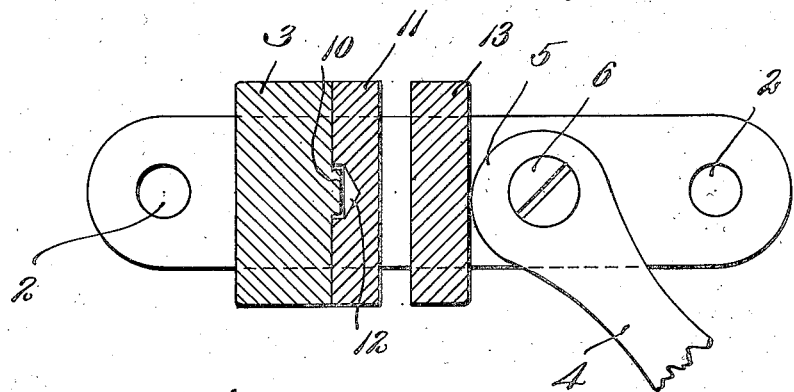
Fig. 5 is a section on the line 5—5 of Fig. 2.

Relative movement between the base and the holder or clamp in a direction transversely of the base would introduce equally unfavorable conditions if it takes place during the cutting operation and to overcome this difficulty the lug 3 which extends transversely of the base is provided with a centering device 10 and the downwardly extending leg 11 of the holder or clamp is provided with a cooperating centering device 12, the construction being such that when the centering devices 10 and 12 are in assembled relation, as indicated in Fig. 5, and the clamp 4 which acts upon the other member 13 of the clamp is moved into holding position with its eccentric surface 5 bearing upon the leg 13 of the holder or clamp, the centering devices are brought into securely locked engagement, with the result that the holder or clamp cannot move in a transverse direction on the base, and in order to prevent vertical separation of the base and holder or clamp the lug 3 extending transversely on the base is provided with a projection 14 which is adapted to engage a complemental recess 15 formed on the exterior surface of the downwardly extending leg 11 and the result of the construction described is that when the pipe 16 has been secured between the jaws or members of the holder or clamp and the latter has been secured in place, as indicated in Figs. 2 and 5, the base and the holder or clamp become securely held together in fixed relation and remain so until after the cutting operation.

The formation of the holder and clamp as described as part separate from the base enables the pipe to be placed within or between the two members of the holder or clamp in proper position while the holder and clamp are still separated from the base. This enables a more accurate adjustment of the pipe relative to the holder or clamp while the parts are still susceptible of adjustment.

I claim:

1. In a pipe cutter vise the combination of a base having a transversely extending lug rising therefrom and provided with a wedge-like centering projection the surfaces of which diverge, a pipe holder formed of two members hinged together at their upper portions to swing to and from closed position, one of said members of the pipe holder having a complemental centering device for engagement with the centering device on the lug when the parts are in operative position and a clamp mounted upon the base for binding the parts in their assembled and operative position so that through the agency of the centering device mounted on the lug and the cooperating centering device mounted on one of the legs of the clamp, all upward or lateral movement of the pipe holder relative to the base is prevented.

2. In a pipe cutter vise the combination of a pipe holder formed of two members connected to swing about an axis at their upper portions and provided with a cutting slot which passes through the hinge connection between the two members of the holder, a base having a transversely extending lug provided with a laterally extending centering projection constituted by inclined surfaces on the lug extending from the upper end portions thereof, and one of the downwardly extending legs of the pipe clamp having interengaging centering devices to engage the lug when the parts are held in clamped position, and a clamp for forcing the legs of the pipe holder towards each other to clamp the pipe and at the same time interengage the centering lug with the centering device on one leg of the pipe clamp so that when the parts are in clamped position the interengaged lug on the projection and the centering device on the leg of the pipe clamp will effectively prevent both vertical and lateral movement of the pipe clamp.

3. In a pipe cutter vise the combination of a pipe holder formed of two members hinged together at their upper portions and having a cutting slot which passes through the hinge connection, a base having a transversely extending lug rising therefrom and provided with a wedge-like laterally extending projection having two surfaces which diverge towards the body of the projection, one of the downwardly extending legs of the pipe clamp being provided with an interengaging portion to engage the inclined surfaces of the projection, and a clamp which forces the two legs of the pipe clamp towards each other and interengages the projection on the laterally extending lug with the centering device on one of the legs, so that when the parts are in operative position the pipe clamp is positively held from vertical movement and also from lateral movement.

WILMOT M. PATERSON.